United States Patent
Pargaonkar et al.

(10) Patent No.: US 10,997,047 B2
(45) Date of Patent: May 4, 2021

(54) AUTOMATIC SELECTION OF AGENT-BASED OR AGENTLESS MONITORING

(75) Inventors: Vishwanath Bandoo Pargaonkar, Bangalore Kamataka (IN); Krishna Mahadevan Ramakrishnan, Bangalore Kamataka (IN)

(73) Assignee: Micro Focus LLC, Santa Clara, CA (US)

( * ) Notice: Subject to any disclaimer, the term of this patent is extended or adjusted under 35 U.S.C. 154(b) by 1888 days.

(21) Appl. No.: 13/260,293

(22) PCT Filed: Sep. 14, 2010

(86) PCT No.: PCT/US2010/048686
§ 371 (c)(1),
(2), (4) Date: Sep. 24, 2011

(87) PCT Pub. No.: WO2011/034827
PCT Pub. Date: Mar. 24, 2011

(65) Prior Publication Data
US 2012/0016706 A1     Jan. 19, 2012

(30) Foreign Application Priority Data

Sep. 15, 2009   (IN) ............ 2231/CHE/2009

(51) Int. Cl.
*G06F 11/30*     (2006.01)
*G06Q 10/06*     (2012.01)
(Continued)

(52) U.S. Cl.
CPC ...... *G06F 11/3006* (2013.01); *G06F 11/3051* (2013.01); *G06F 11/3093* (2013.01);
(Continued)

(58) Field of Classification Search
CPC ............ G06F 11/3006; G06F 11/3051; G06F 11/3093; G06Q 10/063; H04L 41/142; H04L 41/5032; H04L 43/0805
See application file for complete search history.

(56) References Cited

U.S. PATENT DOCUMENTS 5,655,081 A * 8/1997 Bonnell .............. G06F 11/0748
                                                        709/202
5,964,837 A * 10/1999 Chao et al. .................... 709/224
(Continued)

FOREIGN PATENT DOCUMENTS

WO     2007008910     1/2007

OTHER PUBLICATIONS

EMA, Inc. "Leveragling agent and agent less technology for effective operations management", A White Paper Prepared for Hewlett-Packard, Apr. 2007, see pp. 2-4.
(Continued)

*Primary Examiner* — Matthew S Gart
*Assistant Examiner* — Stephen S Swartz

(57) ABSTRACT

Presented is a method and system for automatically selecting agent-based or agentless monitoring using a configuration management database (CMDB). The method includes determining whether a system is business critical or business non-critical, selecting agent-based monitoring if the system is business critical and selecting agentless monitoring if the system is business non-critical.

20 Claims, 2 Drawing Sheets

(51) Int. Cl.
   *H04L 12/24*  (2006.01)
   *H04L 12/26*  (2006.01)
(52) U.S. Cl.
   CPC ......... *G06Q 10/063* (2013.01); *H04L 41/142* (2013.01); *H04L 41/5032* (2013.01); *H04L 43/0805* (2013.01)

(56) References Cited

U.S. PATENT DOCUMENTS

| | | | | |
|---|---|---|---|---|
| 6,070,190 | A * | 5/2000 | Reps | G06F 11/3495 709/203 |
| 7,266,726 | B1 * | 9/2007 | Ladd | G06F 11/2268 714/27 |
| 7,600,007 | B1 * | 10/2009 | Lewis | G06Q 10/04 709/223 |
| 7,934,248 | B1 * | 4/2011 | Yehuda | H04L 41/0893 726/1 |
| 8,185,550 | B1 * | 5/2012 | Eichler | G06F 11/0709 707/783 |
| 10,037,232 | B1 * | 7/2018 | Garcia | G06F 11/3476 |
| 2004/0049365 | A1 * | 3/2004 | Keller | G06F 11/0709 702/186 |
| 2004/0243699 | A1 * | 12/2004 | Koclanes et al. | 709/224 |
| 2005/0049901 | A1 * | 3/2005 | Diao | G06F 11/3447 703/2 |
| 2005/0278703 | A1 * | 12/2005 | Lo et al. | 717/126 |
| 2006/0064481 | A1 * | 3/2006 | Baron et al. | 709/224 |
| 2006/0064485 | A1 * | 3/2006 | Baron | H04L 41/0886 709/224 |
| 2006/0064486 | A1 * | 3/2006 | Baron | H04L 41/0886 709/224 |
| 2006/0149408 | A1 * | 7/2006 | Speeter et al. | 700/126 |
| 2007/0067773 | A1 * | 3/2007 | Hope | G06F 9/542 718/100 |
| 2009/0187413 | A1 * | 7/2009 | Abels et al. | 705/1 |
| 2010/0218104 | A1 * | 8/2010 | Lewis | G06Q 10/04 715/736 |
| 2019/0268214 | A1 * | 8/2019 | Maes | G06F 11/3051 |

OTHER PUBLICATIONS

International Search Report dated May 24, 2011 issued on PCT Patent Application No. PCT/US2010/048686 dated Sep. 14, 2010.

* cited by examiner

AUTOMATIC SELECTION OF AGENT-BASED OR AGENTLESS MONITORING

BACKGROUND

Management of an information technology (IT) network is not new. Various software and hardware solutions are available to manage network architecture. However, with IT infrastructures becoming increasing complex, it has become quiet a task to monitor system performance, and availability of applications and services on a vast variety of networked devices, to ensure a smooth operation.

The advent of service level agreements (SLA) has made clients more demanding, thus, putting additional pressure on a network administrator to constantly monitor applications, servers, databases, data, and various other components that may form part of a managed network environment. For each of these components, decisions must be made whether to use specially deployed agents to conduct the monitoring, or to employ an agentless monitoring solution. To enable an efficient IT environment, having both agentless and agent-based monitoring deployments, it is imperative to choose the right solution for each component in an IT infrastructure.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
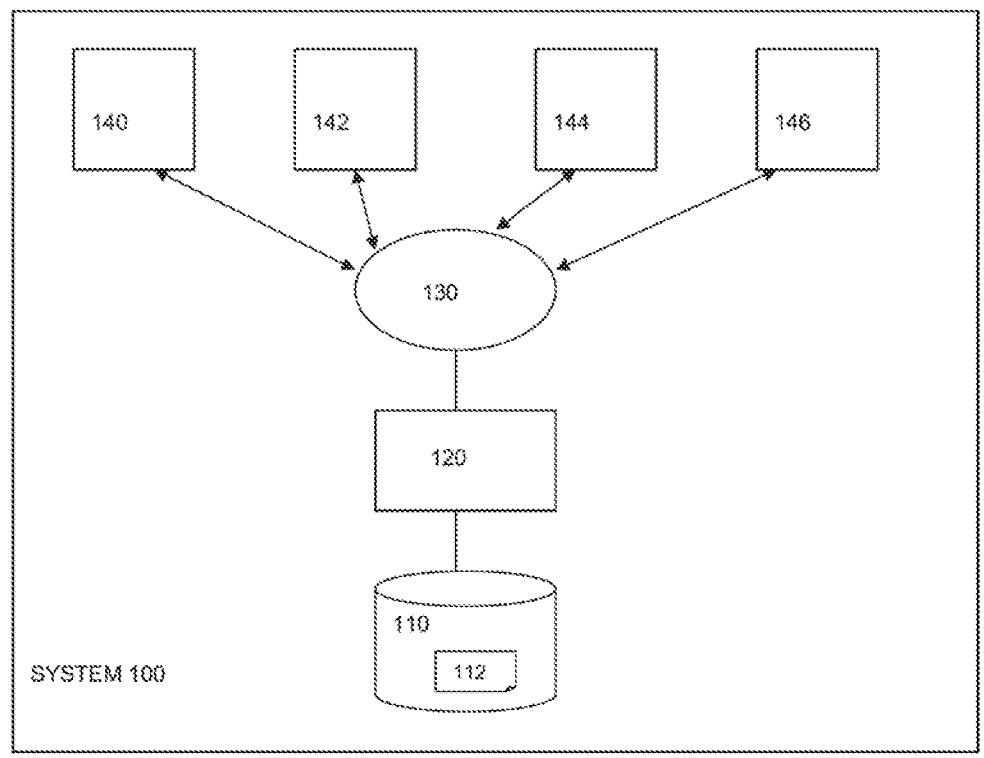
FIG. 1 shows a system for automatic selection of an agent-based or agentless monitoring for an information technology system using a configuration management database (CMDB) according to an embodiment.

Management of an IT infrastructure requires a monitoring solution that keeps IT informed of everything happening in the IT environment. The solution should allow IT to monitor each component of the IT environment to ensure that IT systems are performing at the agreed level and meeting service level agreements. Agent-based and agentless solutions are two monitoring solutions that have been commonly used. However, combination of agent based and agent-less monitoring for system performance and availability management in IT infrastructure is also gaining popularity.

In the agent-based solution, a software module called agent is installed on each IT system (for example, a server) to be monitored. The agents are configured to collect performance metrics depending on the application and the hardware profile of the IT system. The functionality of the agent also extends to storing of collected data locally, raising alarms and resolving the same by taking corrective actions independently. They can monitor the status (availability and performance) of applications, servers, and network devices in more detail than common management tools. However, agents tend to be expensive and having agents on an IT component comes at a cost of high maintenance, resource usage, scalability, and deployment complexity.

Agentless technology allows monitoring and management of an IT environment remotely, over the network, without having to install agents on the components to be monitored. The agent-less solution involves monitoring an IT system remotely by collecting data periodically using standard interfaces (such as SNMP). It allows administrators to get monitoring up and running more quickly. However, agentless monitoring has its own drawbacks. The agentless monitoring tools do not have the same depth of features and provide limited control over the IT system being monitored. Therefore, while the maintenance and deployment costs are negligible, the relatively high network traffic and the non-availability of real-time data are big deterrent for agentless monitoring solutions.

Selecting an agent-based or agentless monitoring solution for monitoring system or application performance and/or availability depends on the criticality of the system or application to a company's business revenue and processes. Hence, business criticality of the systems plays a major role in determining the solution to be deployed to monitor the system. A configuration management database (CMDB) may help in making that selection.

A CMDB is a comprehensive warehouse of information related to all the components of an IT network. It provides a single central point view of the relationships between an IT infrastructure and business services. HP Universal Configuration Management Database (HP CMDB) is an example of one such tool. HP CMDB utilizes a data model that accommodates not only physical components such as servers, networking and storage devices, and software but also logical elements key to business service delivery, such as business applications, virtual private networks, end users and service level agreements.

For clarity and convenience, following definitions are used herein:

The term "system" or "information technology system" refers to, and includes, an information technology device having any software and hardware configuration.

The term "business critical system" refers to all systems, failure of which impacts either business service or revenue. The performance or availability of any system that affects a service level agreement (SLA) of an associated business service is also considered a business critical system.

FIG. 1 shows a system 100 for automatic selection of an agent-based or agentless monitoring for an information technology system using a configuration management database (CMDB) according to an embodiment.

The system 100 includes a configuration management database (CMDB) 110, a configuration management server 120, network 130, and information technology (IT) systems (140, 142, 144, and 146). It would be appreciated that the components depicted in FIG. 1 are for the purpose of illustration only and the actual components (including their number) may vary depending on the computing architecture deployed for implementation of the present invention.

Configuration management database (CMDB) 110 describes the configuration items (CI) 112 in an information technology environment and the relationships between them. A configuration item basically means component of an IT infrastructure or an item associated with an infrastructure. A CI may include, for example, servers, computer systems, computer applications, routers, etc. The relationships between configuration items (CIs) may be created automatically through a discovery process or inserted manually. Considering that an IT environment can be very large, potentially containing thousands of CIs, the CIs and relationships together represent a model of the components of an IT environment in which a business functions. The CMDB stores these relationships and handles the infrastructure data collected and updated by a discovery process. The discovery process enables collection of data about an IT environment by discovering the IT infrastructure resources and their interdependencies (relationships). The process can discover such resources as applications, databases, network devices, different types of servers, and so on. Each discovered IT component is discovered and stored in the configuration management database where it is represented as a managed configuration item (CI).

Information technology systems (140, 142, 144 and 146) are connected to a configuration management server 120 through network 130. The configuration management server 120 gathers various details for each information technology system (140, 142, 144 and 146) and stores them in the configuration management database 110. An information technology system may represent a server, software applications, data, storage devices, networks, etc. The configuration management database may include configuration items (CIs, 112), which are data structures representing IT resources that are placed under configuration management.

Network 130 may be the internet, an intranet or an extranet. Further, the network may include a wired or wireless connection.

Figure 2:
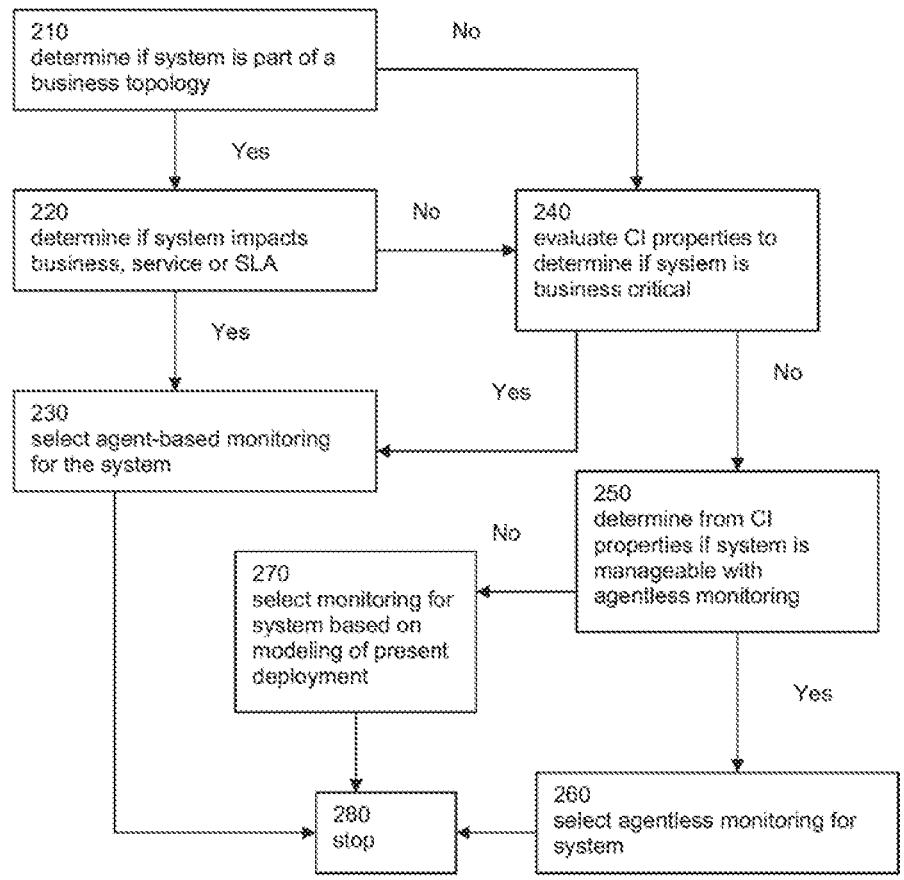
FIG. 2 shows a flow chart of a method for automatic selection of an agent-based or agentless monitoring for an information technology system using a configuration management database (CMDB) according to an embodiment.

FIG. 2 shows a flow chart of a method for automatic selection of an agent-based or agentless monitoring for an information technology system using a configuration management database (CMDB) according to an embodiment.

As mentioned earlier, the term business critical system refers to all systems, failure of which impacts either business service or revenue. If the performance or availability of any system affects a service level agreement (SLA) of an associated business service, it is also considered a business critical system.

In an embodiment, as a pre-requisite, the CMDB is populated using a discovery mechanism and business topology is modeled in CMDB. The impact of a system on a business service or revenue is derived from the business service topology stored in CMDB.

Referring to FIG. 1, step 210 includes determining whether an information technology system is business critical or business non-critical. This includes determining whether the information technology system is part of a business service topology. The business service topology is stored in the configuration management database (CMDB) and impact of a system on a business service or revenue may be derived from the business service topology stored in CMDB. Applications built on top of CMDB may be used to find if a system's performance or availability has an impact on SLA of a business service.

If a determination is made in step 210 that the system is part of a business service topology, the method proceeds to step 220, else it proceeds to step 240 (described later).

Step 220 includes determining whether the system impacts a business service, revenue or a Service Level Agreement (SLA).

If a determination is made in step 220 that the system impacts a business service, revenue or a Service Level Agreement (SLA), the method proceeds to step 230, wherein an agent-based monitoring is selected for the system.

If a determination is made in step 220 that the system does not impact a business service, revenue or a Service Level Agreement (SLA), the method, proceeds to step 240.

Step 240 includes evaluating configuration item (CI) properties of an associated CMDB. As mentioned earlier, configuration items (CIs) may be defined in the CMDB. A mark-up language may be used to define configuration items. Each CI may have one or more properties (enrichments) that may describe the type of the system (test system, end-user system, etc.), location of a system (for example, whether it's in DMZ), etc.

If the evaluation made in step 240 leads to a conclusion that the system is business critical, an agent-based solution is assigned to the system, else, the method proceeds to step 250.

Step 250 includes determining from the configuration item (CI) properties whether the system is manageable with agentless monitoring.

If the determination made in step 250 leads to a conclusion that the system is manageable with agentless monitoring, an agentless solution is assigned to the system at step 260, else, the method proceeds to step 270.

Step 270 includes selecting agent-based or agentless monitoring based on modeling of the existing deployment.

The method concludes at step 280.

It would be appreciated that the embodiments described above saves solution deployment time by automating the decision making process. The IT administrator need not bother about the type of solution that may suit a particular system. Hence using the proposed solution deployment can be done even by a novice user. Further, correct solution is deployed on the right systems, thereby making sure all business critical systems have the right kind of monitoring solution.

It would be further appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method for automatically selecting agent-based or agentless monitoring, the method comprising:
   determining by a processor, based on a plurality of configuration items included in a configuration management database, whether a system is part of business service topology of a specific business service;
   in response to a determination that the system is part of the business service topology of a specific business service, determining by the processor, based on properties of the plurality of configuration items in the configuration management database, whether the system impacts the specific business service;

determining, by the processor, that the system is business critical with respect to the specific business service in response to a determination that the system impacts the specific business service;

determining, by the processor, that the system is business non-critical with respect to the specific business service in response to a determination that the system does not impact the specific business service;

selecting, by the processor, between agent-based monitoring and agentless monitoring based on a determination of whether the system is business critical or business non-critical with respect to the specific business service, wherein a selection of agentless monitoring, and not agent-based monitoring, is made in response to a determination that the system is business non-critical, and wherein a selection of agent-based monitoring, and not agentless monitoring, is made in response to a determination that the system is business critical; and in response to a selection of agent-based monitoring, installing a monitoring agent on the system, the monitoring agent to collect information associated with the system.

2. A method according to claim 1, wherein determining whether the system impacts the specific business service comprises determining whether the system impacts a revenue of the specific business service.

3. A method according to claim 1, wherein determining whether the system impacts the specific business service comprises determining whether the system impacts a Service Level Agreement (SLA) of the specific business service.

4. A method according to claim 1, comprising populating the plurality of configuration items in the configuration management database using a discovery mechanism.

5. A method according to claim 1, wherein the properties of the plurality of configuration items include a location of the system.

6. A method according to claim 1, further comprising:
in response to a selection of agentless monitoring, remotely collecting information associated with the system via a network without using an installed agent.

7. A method according to claim 6, wherein remotely collecting information associated with the system comprises using a Simple Network Management Protocol (SNMP) interface and not using an installed agent.

8. A method according to claim 1, further comprising:
selecting agentless monitoring, and not agent-based monitoring, in response to a determination that the properties of the plurality of configuration items indicate that the system is manageable with agentless monitoring.

9. A method according to claim 1, further comprising:
selecting agent-based or agentless monitoring based on modeling an existing deployment.

10. A method according to claim 1, wherein the properties of the plurality of configuration items include a type of the system.

11. An apparatus comprising:
a processor, and a memory comprising program instructions; and
a configuration management database (CMDB), wherein the program instructions are executable by the CMDB to:

determine, based on a plurality of configuration items included in the CMDB, whether a system is part of business service topology of a specific business service;

in response to a determination that the system is part of the business service topology of a specific business service, determine, based on properties of the plurality of configuration items in the configuration management database, whether the system impacts the specific business service;

determine that the system is business critical with respect to the specific business service in response to a determination that the system impacts the specific business service;

determine that the system is business non-critical with respect to the specific business service in response to a determination that the system does not impact the specific business service;

select agent-based monitoring, and not agentless monitoring, in response to a determination that the system is business critical with respect to the specific business service;

select agentless monitoring, and not agent-based monitoring, in response to a determination that the system is business non-critical with respect to the specific business service;

in response to a selection of agent-based monitoring, install a monitoring agent on the system, the monitoring agent to collect information associated with the system; and in response to a selection of agentless monitoring, remotely collect information associated with the system via a network without using an installed agent.

12. An apparatus according to claim 11, further comprising program instructions to determine whether the system impacts the specific business service based on a determination as to whether the system impacts a revenue of the specific business service.

13. An apparatus according to claim 11, further comprising program instructions to determine whether the system impacts the specific business service based on a determination as to whether the system impacts a Service Level Agreement (SLA) of the specific business service.

14. A non-transitory machine-readable medium comprising instructions that when executed by a processor, cause the processor to:

determine, based on a plurality of configuration items included in a configuration management database, whether a system is part of business service topology of a specific business service;

in response to a determination that the system is part of the business service topology of a specific business service, determine, based on properties of the plurality of configuration items in the configuration management database, whether the system impacts the specific business service;

determine that the system is business critical with respect to the specific business service in response to a determination that the system impacts the specific business service;

determine that the system is business non-critical with respect to the specific business service in response to a determination that the system does not impact the specific business service;

select agent-based monitoring, and not agentless monitoring, in response to a determination that the system is business critical with respect to the specific business service;

select agentless monitoring, and not agent-based monitoring, in response to a determination that the system is business non-critical with respect to the specific business service;

in response to a selection of agent-based monitoring, install a monitoring agent on the system, the monitoring agent to collect information associated with the system; and in response to a selection of agentless monitoring, remotely collect information associated with the system via a network without using an installed agent.

15. A non-transitory machine-readable medium according to claim 14, wherein the properties of the plurality of configuration items include a location of the system.

16. A non-transitory machine-readable medium according to claim 14, comprising instructions executed by the processor to determine whether the system impacts the specific business service based on a determination as to whether the system impacts a revenue of the specific business service.

17. A non-transitory machine-readable medium according to claim 14, comprising instructions executed by the processor to determine whether the system impacts the specific business service based on a determination as to whether the system impacts a Service Level Agreement (SLA) of the specific business service.

18. A non-transitory machine-readable medium according to claim 14, wherein the properties of the plurality of configuration items include a type of the system.

19. An apparatus according to claim 11, wherein the properties of the plurality of configuration items include a location of the system.

20. An apparatus according to claim 11, wherein the properties of the plurality of configuration items include a type of the system.

* * * * *